United States Patent [19]

Sharp et al.

[11] Patent Number: 5,406,073
[45] Date of Patent: Apr. 11, 1995

[54] SYSTEM FOR DETECTING A MOVABLE ENTITY WITHIN A SELECTED SPACE

[75] Inventors: Gordon P. Sharp, Newton; Phillip G. Ahern, Arlington, both of Mass.

[73] Assignee: Phoenix Controls Corporation, Newton, Mass.

[21] Appl. No.: 9,189

[22] Filed: Jan. 25, 1993

[51] Int. Cl.⁶ .............................................. G01V 9/04
[52] U.S. Cl. ...................................... 250/221; 454/56
[58] Field of Search ................ 250/221, 222.1, 561; 454/56, 61, 58, 343

[56] References Cited

U.S. PATENT DOCUMENTS

| | | | |
|---|---|---|---|
| 4,967,083 | 10/1990 | Kornbrekkle et al. | 250/221 X |
| 5,196,689 | 3/1993 | Sugita et al. | 250/221 X |
| 5,225,689 | 7/1993 | Bückle et al. | 250/221 |
| 5,240,455 | 8/1993 | Sharp | 454/61 |
| 5,245,117 | 9/1993 | Schiller | 250/221 |

*Primary Examiner*—David C. Nelms
*Assistant Examiner*—John R. Lee
*Attorney, Agent, or Firm*—Wolf, Greenfield & Sacks

[57] ABSTRACT

A system is provided for detecting presence and/or motion of a person or other movable entity within a selected space. Detection is accomplished by detecting reflected light or other radiation from the space, presence being signified when detected radiation differs from an established background, either up or down, by an amount exceeding a predetermined threshold. Blending of the entity with the background is avoided by viewing the entity at at least two different angles with different background, for example by use of two spaced detectors, and variations in background are automatically compensated for when a presence indication persists for a selected period of time after the last motion indication is received. The background is updated to the current level when this occurs. With light radiation, the light sources are structured to irradiate substantially the entire space and saturation of a detector by ambient radiation is avoided by providing a bandpass filter which passes only radiation in a narrow overlap wavelength band for the radiation sources and detectors.

37 Claims, 6 Drawing Sheets

SYSTEM FOR DETECTING A MOVABLE ENTITY WITHIN A SELECTED SPACE

FIELD OF THE INVENTION

This invention relates to detection systems for a person or other movable entity and more particularly to an adaptive system which detects both presence and motion of such entity within a selected space with enhanced ability to avoid ambient light saturation and with enhanced ability to detect entities which are radiation absorbers, which have a radiation absorption/reflection profile which substantially matches that of the background and/or who both reflect and absorb the light or other incident radiation substantially equally.

BACKGROUND OF THE INVENTION

There are numerous applications where it is desirable to detect the presence of a person, animal, vehicle or other movable entity (sometimes hereinafter referred to as an "entity", "person" or "individual") within a selected three-dimensional space, motion of the entity within such space and/or the rate or speed at which and the direction in which the entity is moving through such space. One such application is discussed in copending application Ser. No. 07/749,279, filed Aug. 23, 1991 now U.S. Pat. No. 5,240,455. In this application,i to save energy and for other purposes, a laboratory fume hood is normally operated at a low face velocity. However, when a person comes within a selected area or space in front of the hood, such presence and/or motion is detected and the face velocity of the fume hood is automatically increased to enhance hood containment and to minimize any likelihood of the individual inhaling or coming in contact with a contaminant within the hood. Other applications where personnel detection or other movable entity detection within a selected space are desired include various security systems, including machine security systems which might close off a dangerous opening or enable some other safety feature when a person is within a selected area of the machine, animal confinement or control system, etc.

While many such detection systems are currently available, these systems generally suffer from a number of limitations. First, pyro-electric infrared systems detect changes in heat patterns caused by movement of a person or animal relative to background radiation in a selected space. However, since such systems are only adapted for detecting movement of an entity, if the entity stands still in the area, they blend into the background and are not detected. For this reason, a reliable determination that a person is no longer in the protected space cannot be made until no motion has been detected for a substantial time period, for example, five minutes. These systems thus have a slow response time to a person leaving the area, resulting in, for example, the fume hood application in the fume hood being in the more expensive high velocity mode for unnecessarily long periods of time.

Therefore, for applications such as control of a fume hood, near infrared or active systems are preferred, such systems detecting reflections of a transmitted infrared beam (or other radiation) from the selected space, or the absence of such reflections. One problem with near infrared systems currently in use is that they generally employ a single transmitter and a single receiver which are focused to a particular point within the space rather than providing broad coverage of the entire space. While the beam can be scanned to cover the entire area over some time period, such scanning is typically in only one direction, providing a band or zone within the space of interest which is being monitored, but not monitoring the entire space of interest.

A second problem with such systems is that, if the person is wearing clothing which is highly absorptive of the radiation being transmitted, for example black cotton for infrared radiation and animal fur for ultrasonic radiation, there will be no reflections from such entity entering the space. In many systems, this absorption creates the so-called "stealthperson" phenomenon which results in a lack of detection. The severity of this problem will depend to some extent on the radiation being used, not being a problem for microwaves which are not readily absorbed, and being much more of a problem for infrared and ultrasonic radiation. However, for reasons of cost, safety to individuals being scanned, and other reasons, infrared radiation is the preferred radiation for at least personal detection at this time.

A related problem results from the fact that an individual is detected by changes in reflection caused by the individual as opposed to the background. The changes in, reflected radiation result from the fact that, at the point being scanned, the reflection/absorption ratio for the individual is different than that for the background. However, if for example the individual is wearing a shirt which, at the distance the individual is from the emitter/detector, has the same reflective coefficient as the background, and a narrow scan focuses only on such shirt, the system may not be able to distinguish the individual from the background. Even if a larger area of the individual is scanned, if for example the individual is wearing dark pants and a white shirt, the average reflection from the individual in a particular scan direction may still be substantially the same as the background. Since to avoid spurious detections resulting from normal changes in background reflections over time (resulting from changes in ambient light conditions and other factors), detection of an individual in the selected space is normally not recognized unless a change in reflected radiation is detected exceeding a predetermined threshold, any small changes in reflected radiation from an individual having an average reflection/absorption pattern at the scan angle which substantially matches that of the background would not exceed the threshold, and the presence of the individual would, therefore, not be detected.

Another potential problem, particularly if light or other radiation is being received from a large area rather than from a single point, is that there may be substantial ambient radiation, for example sunlight or other ambient light, in the selected space and this ambient radiation may saturate the detectors so as prevent detection of an entity. While fail-safe procedures can be provided to assure detection when saturation occurs, this defeats the purpose of the entity detection system and it is preferable if such saturation can be avoided.

A related problem is that detection is based on a change in reflection pattern from background conditions. However, either because of movement of furniture or equipment in the space or other factors, the background radiation detection pattern may change. Most current systems are not adapted to automatically react to such changes in background conditions and, therefore, may not provide reliable detection. In particular, such systems may continue to provide a presence indication because of the background change even though there is no person in the selected space.

The above problem results from the fact that current near infrared systems detect only presence. It is therefore desirable in at least some applications to not only detect presence in the space, but to also detect motion. Detection of the direction and/or rate or speed of such motion are also desirable. Thus, action may be different if somebody is standing still in a protected area or is moving through an outer portion of the area in a direction parallel to a protected element than if a person is rapidly moving toward the protected element. Existing near infrared systems, and other systems of this type, are not generally capable of providing a motion indication and, in particular, are not capable of providing information concerning direction or speed of motion.

A need therefore exists for improved detection systems for persons or other movable entities, which systems (a) are capable of detecting both presence and motion throughout a relatively large three-dimensional space; (b) are able to compensate for changes in background condition from such space; (c) are able to detect "stealthpersons"; (d) are able to detect individuals having reflection/absorption patterns which may, at at least some distances and angles, substantially match the background absorption/reflection patterns; (e) permit detection of an individual in relatively high ambient light or other radiation conditions by avoiding saturation of the detector; and (f) have the capability for detecting direction and speed of motion.

SUMMARY OF THE INVENTION

In accordance with the above, this invention provides a system for detecting a movable entity within a selected three-dimensional space which utilizes at least one source of radiation at a selected frequency band, for example infrared or other light, and at least one radiation detector operating at least in part in the same frequency band. The radiation source or sources are structured to irradiate substantially all of the three-dimensional space and the one or more detectors are structured to receive radiation reflected from a person within the space. An indication of background level radiation may be established for each detector for each separate zone within the selected space from which the detector receives radiation. A change in radiation level from each detector is recognized and an indication of an entity within the selected space is provided for at least one of the detectors in response to such recognition.

For presence detection, the output from each detector is compared with an established background level indication for the detector, with the presence of an entity in the selected space being indicated if the comparison for any detector detects a difference between the detected and stored levels which exceeds a predetermined threshold. Independently viewing the space from different angles with different backgrounds substantially reduces the possibility of an entity blending into the background and being missed. Such difference may be either positive or negative, thus assuring the detection of an individual who is, for example, wearing highly absorptive clothing (i.e. stealthperson). To compensate for changes in the background reflection/absorption pattern, a differential background level or threshold is provided, with the stored background level indication for a detector being changed in response to changes in the background for such detector.

To permit motion detection, the system may also recognize a rate of change in the output from at least one of the detectors within a predetermined range, for example, a low frequency changes, with motion in the selected space being indicated in response to the recognition of a rate of change for the detector within such predetermined range. For a preferred embodiment, changes in the stored background level for a detector occur in response to a presence indication coupled with no motion indication for a predetermined time interval.

To prevent rapid changes in presence indication, the turning off of a presence indication is delayed until a "no presence" detection has persisted for a predetermined time interval (i.e. the presence indication is maintained for such period).

For a preferred embodiment, there are a plurality of sources of radiation, each of which contains a plurality of infrared emitters, with each of the emitters being structured to irradiate a selected zone within the selected space. The emitters may, for example, be pointed in a direction to generally irradiate the selected zone, and/or may include a lens through which the output of the emitter is passed to cause such output to generally irradiate the selected zone. A chamber may also be provided for each of the sources, the chamber having four side walls, the source position near the rear of the chamber, and an open front through which radiation from the source passes, the chamber controlling the selected zones for the emitters of the corresponding source. A mask positioned over at least selected ones of the open chamber fronts may further control the selected zones for the emitters of the corresponding source.

For preferred embodiments, there are also a plurality of detectors, with the detectors being spaced from each other, and search detector being structured to receive radiation from the space. Lenses, chambers and/or masks may also be used to define detection zones for each detector. Where a single detector is utilized, zone detection may be achieved by providing a plurality of sources of radiation, each of which is structured to irradiate a selected zone within the space, and by sequentially energizing the sources to sequentially irradiate zones within the space.

To prevent saturation of the light detectors by ambient light, the selected frequency band at which the radiation sources operate may have a narrow frequency band overlap with the detector frequency band and an optical band-pass filter may be provided to filter the ambient radiation reflected to each detector so as to pass only radiation which is substantially within the narrow overlap frequency band. Thus, the detectors do not receive most of the ambient light radiation in the space and are, therefore, less likely to become saturated by such ambient radiation.

Fail-safe protection for the system may be provided by detecting saturation of a detector and providing an indication of an entity within the space in response to such a saturation detection. In particular, saturation may be indicated by the detecting of a DC output from a detector, which output exceeds a predetermined value. Alternatively, where the sources are energized at a selected clock rate, the absence of a signal at such clock rate from a detector may be indicative of detector saturation or of some other system problem.

The system may also include a means for detecting the speed at which an entity is moving through the detected space and/or the direction of such motion.

Such detection may, for example, be accomplished by detecting the slope of the output from at least one detector. Alternatively, where there are a plurality of detectors, direction and speed detection may be effected by detecting peaks at each detector, determining the time between peaks at successive detectors and utilize order of the peaks and the determined time between peaks to determine speed.

The foregoing and other objects, features and advantages of the invention will be apparent from the following more particular description of preferred embodiments of the invention as illustrated in the accompanying drawings.

IN THE DRAWINGS

Figure 4A:
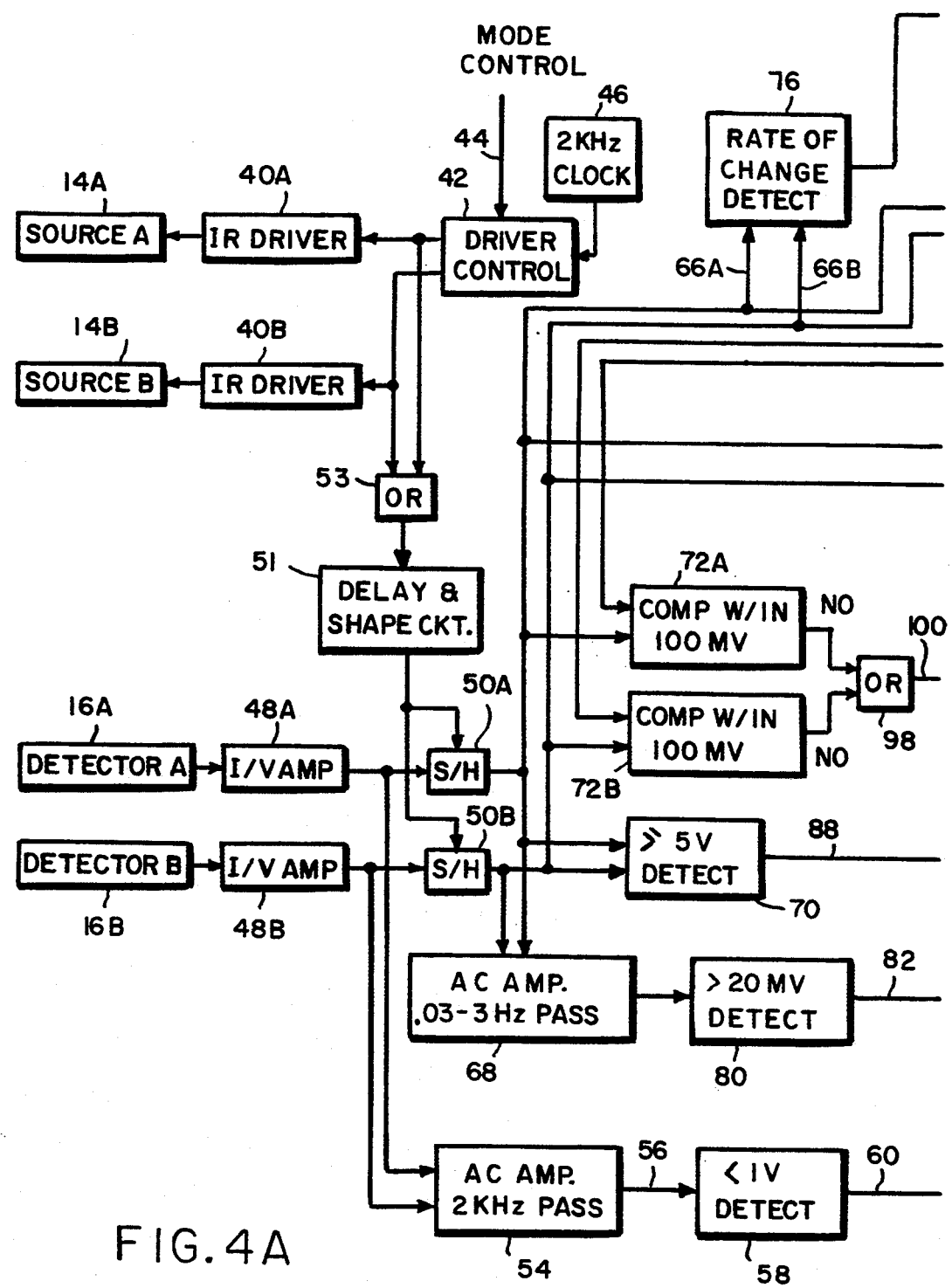
Figure 4B:
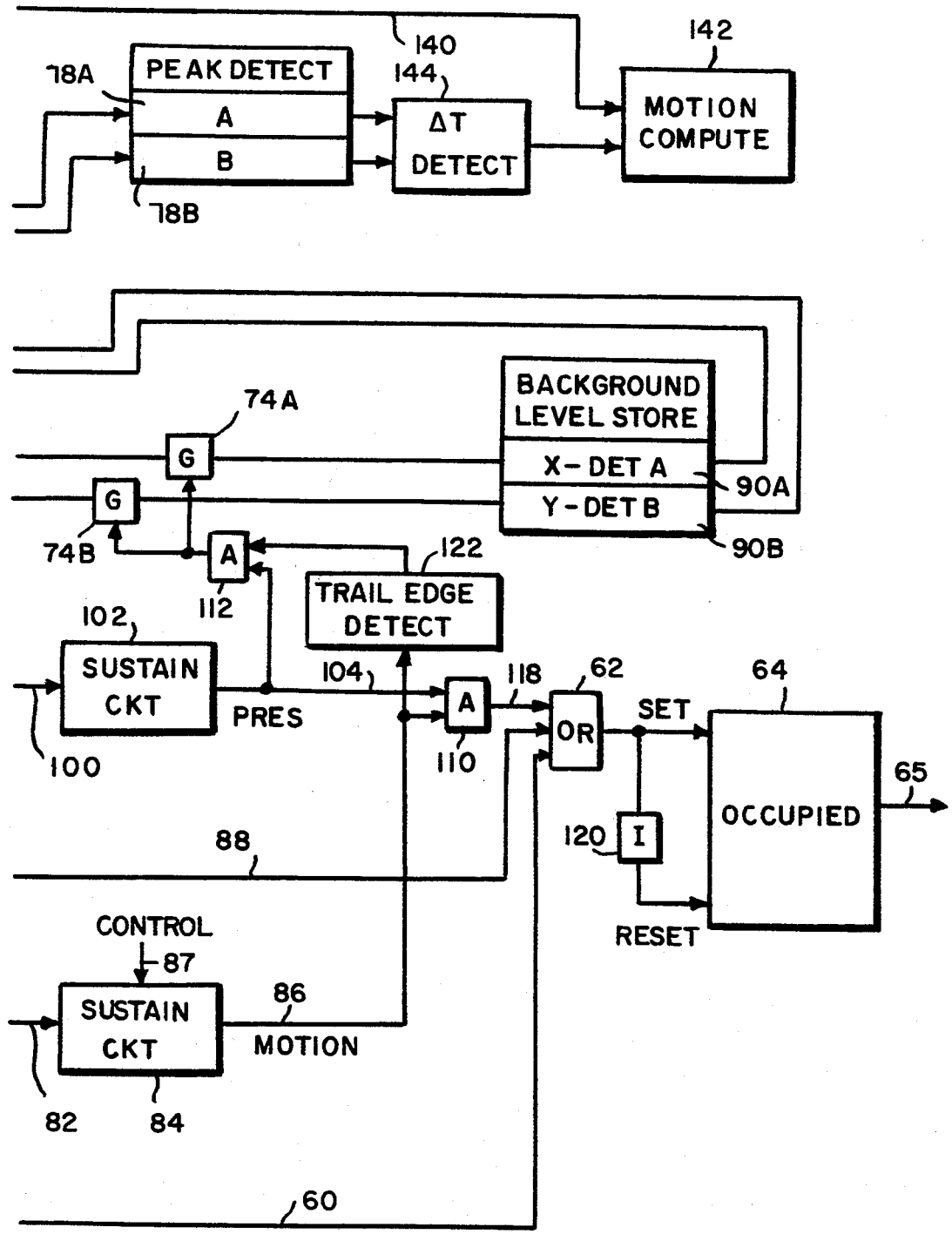

FIGS. 4A and 4B, when combined, form a schematic block diagram for an illustrative embodiment of the invention.

Figure 5A:
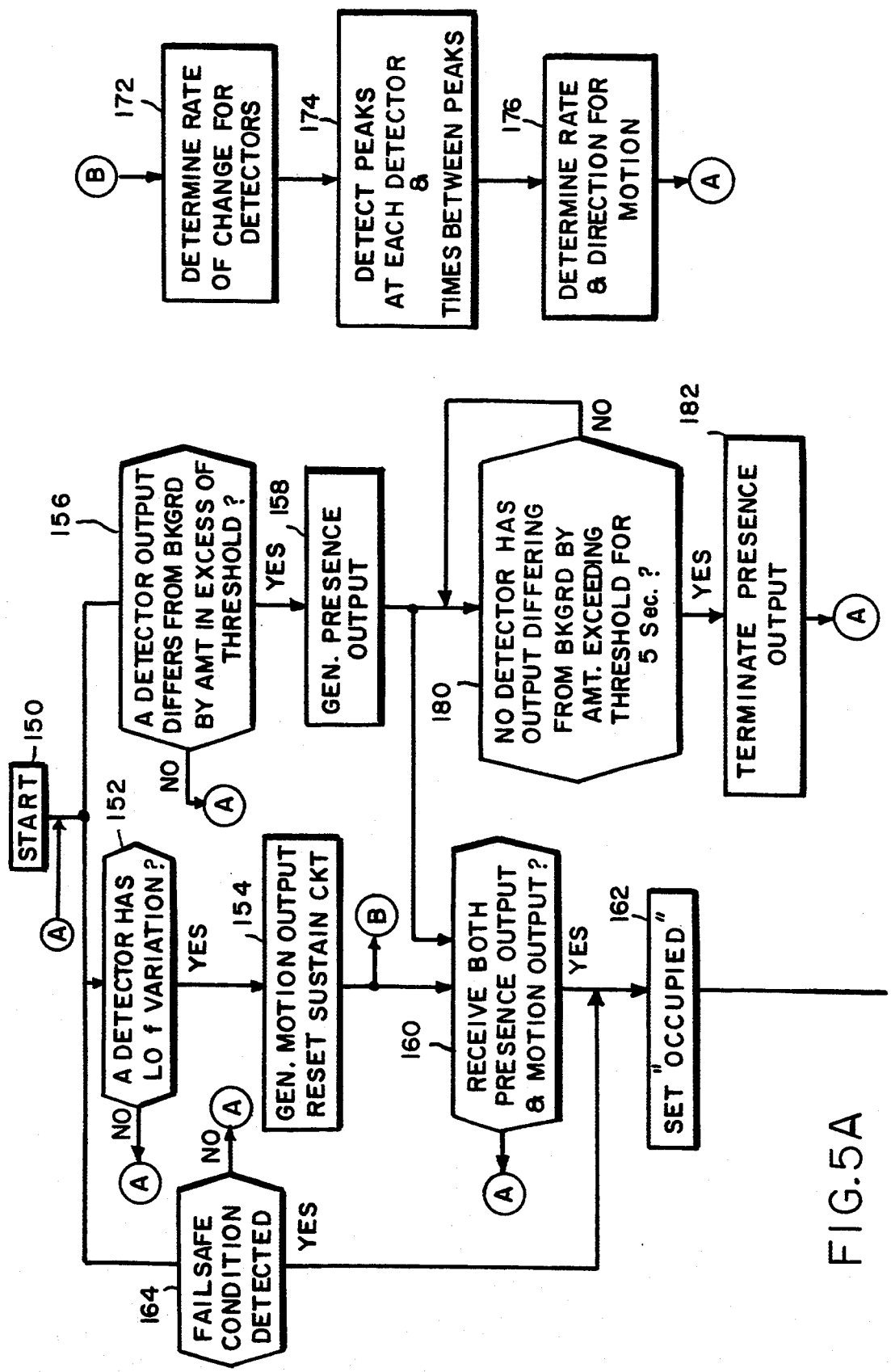
Figure 5B:
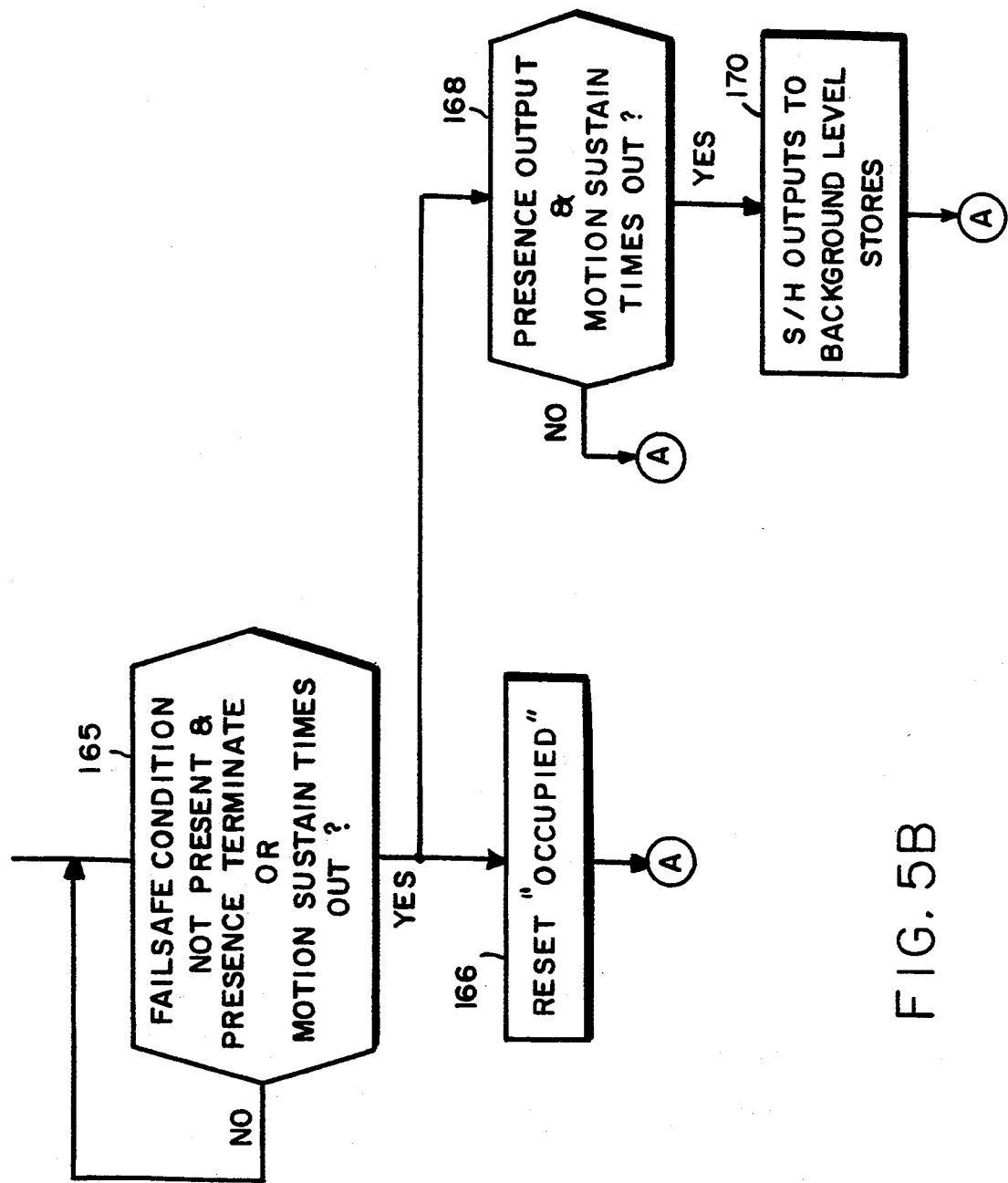

FIGS. 5A and 5B, when combined, form a flow diagram illustrating the operation of the embodiment shown in FIG. 4.

DETAILED DESCRIPTION

Figure 1:
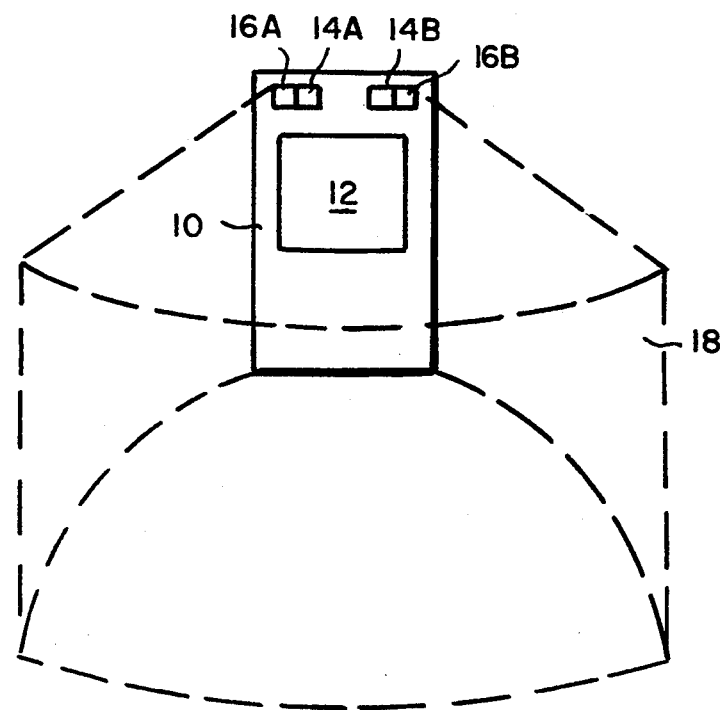
FIG. 1 illustrates a fume hood application of the invention including an exemplary three-dimensional selected space in which detection is to occur.

FIG. 1 shows a fume hood 10 having an opening 12 which may be fully open or may be partially or fully closed by a sash. In accordance with the teachings of this invention, a pair of spaced radiation source/detector units 13A, 13B are mounted to the front of the hood. Each unit 13 has a radiation source 14A, 14B and a radiation detector 16A, 16B. The location of the units 13 or of individual radiation sources 14 and detectors 16 on fume hood 10 are for purposes of illustration and these elements could be positioned elsewhere on the hood so long as the sources provide substantially full coverage of an area 18 in front of the hood, in which area presence and motion detection is desired and so long as the detectors 16 are capable of receiving radiation from all of such area or space. For the FIG. 1 fume hood embodiment, space 18 may be 2" to 3" deep, 7' high and of a width comparable to that of the hood 10. For the embodiment of FIGS. 2A–2C, the space tapers down to a lower height, for example 1' to 3' at the outer edges of the space. Both units 13 may be enclosed within a common housing which also contains a circuit board on which the units are mounted.

Figure 2A:
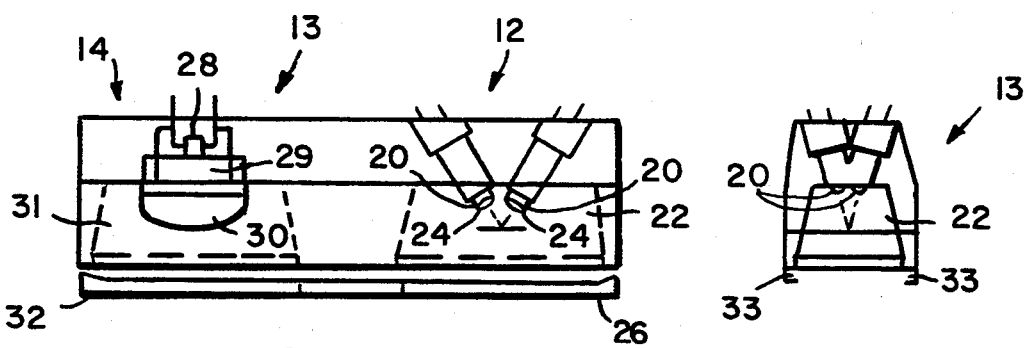
FIGS. 2A–2C are a top sectional view, front view and side sectional view, respectively, of an infrared radiation source and detector unit suitable for use in a preferred embodiment of the invention.
Figure 2C:
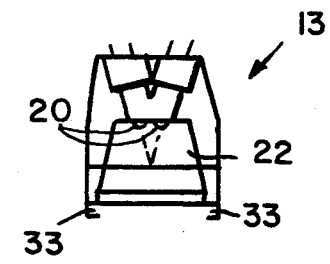
Figure 2B:
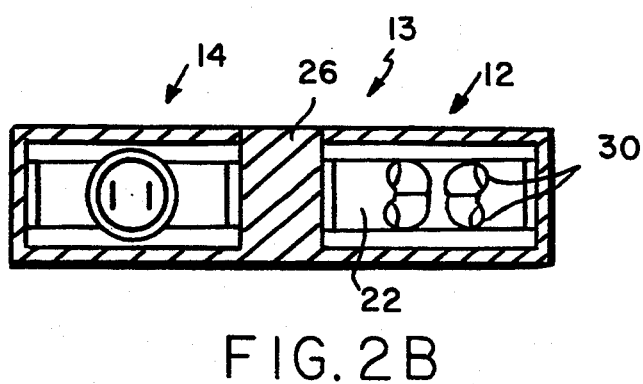

FIGS. 2A–2C illustrate a single source detector unit 13. While a variety of sources of radiation may be used in practicing the teachings of this invention, including microwave emitters, ultrasonic emitters, and lasers or other light sources, for a preferred embodiment of the invention, each source 14 is formed of four infrared light-emitting diodes (LED's) 20. These LED's are mounted in the rear of a corresponding box-like channel or enclosure 22. The LED's 20 have different orientations (i.e. are aimed in different directions) so as to provide full coverage of the space 18. To reduce the size of the enclosure 22, the radiation paths of some of the LED's may criss-cross. A lens 24 is built in or otherwise provided at the front end of each LED 20 to further facilitate irradiation or illumination by each LED of the desired zone in space 18. Each lens 24 is preferably a wide-angle lens resulting in a cone of light at the LED output rather than a beam.

Three additional factors control the zone which is irradiated by each LED. First, by positioning the LED's in the rear of channel or enclosure 22, the walls of the channel limit the output angle for the LED radiation, thus further defining the zones irradiated by the LED's. If desired, a mask 26 may be placed over the open end of each channel 22 to further limit the output angles, and thus the irradiation zones for the LED's 20. Finally, each unit 13 may be mounted at a selected angle on the front of hood 10, such angle typically being 0° to 90° to the plane of the hood. The angle is 10° for an illustrative embodiment. By providing a suitable number of LED's 20 in each radiation source 14, by properly orienting the unit and the LED's and by proper use of lenses 24, enclosures or channels 22 and, if necessary, masks 26, irradiation of the entire desired space 18 may be accomplished without substantial irradiation of areas outside this space. Controlled broad-area irradiation is thus provided.

Similarly, detector 14 also has several elements for controlling the zone from which the detector receives light. In particular, each detector consists of an assembly formed of a photodiode 28, an optical band-pass filter 29, and a wide-angle lens 30. These elements are mounted in the rear of a chamber 31 and a mask 32 may be provided over the front of channel 31. Ideally, each photodiode 28 receives infrared radiations from the entire zone 18, but chamber 12, and if needed mask 32, prevents the detector from receiving any substantial radiation from outside of zone 18. If filters 26 and 32 are desired, channels 33 are provided on the top and bottom of the housing containing chambers 22 and 31 as shown in FIG. 2C for receiving the filters. Alternatively, the channels 33 may be provided on the left and right side of these housings.

Figure 3:
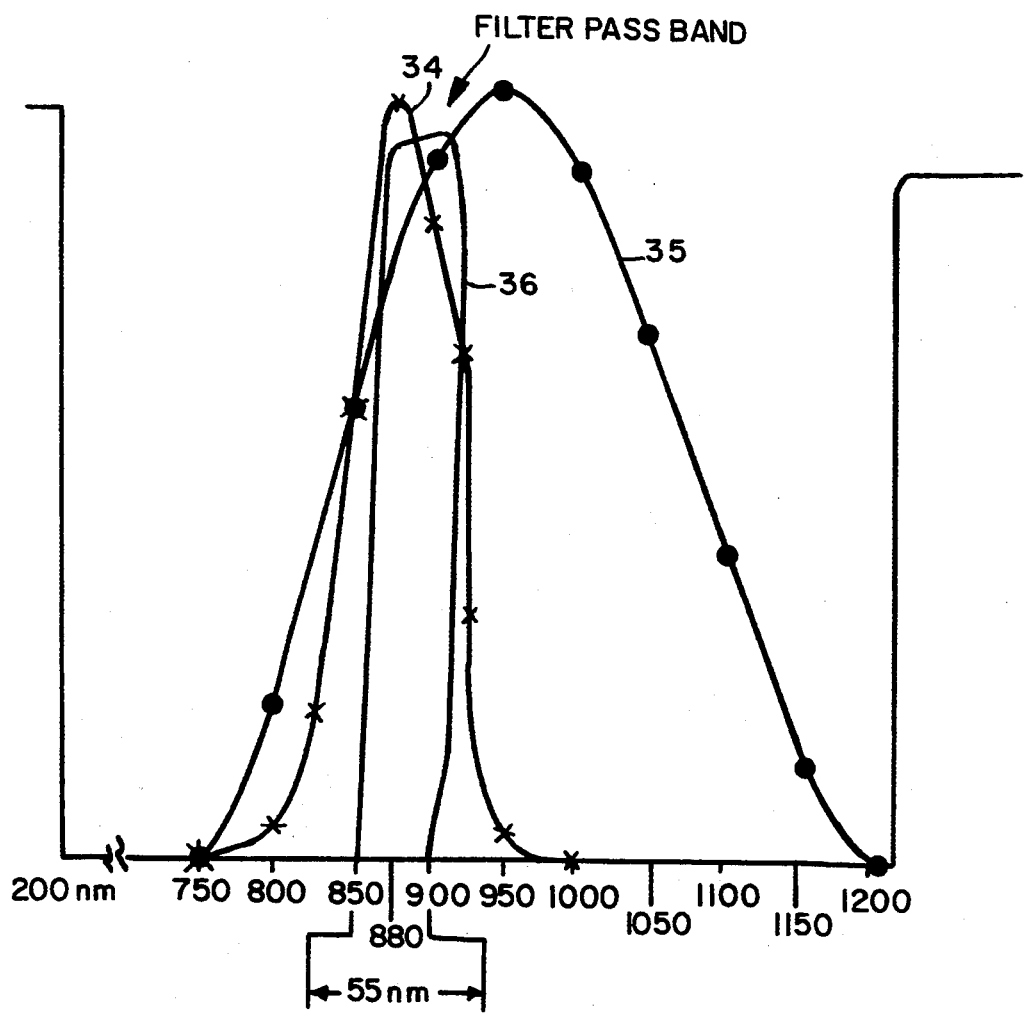
FIG. 3 is a diagram of energy versus wavelength for an infrared source, a detector and a band-pass filter.

Filters 29 are provided to reduce the possibility of the detector becoming saturated by high ambient light conditions. Referring to FIG. 3, sunlight may contain substantial energy over a wide optical wavelength band which generally extends at least from 200 nm to 1200 nm. From FIG. 3, it is seen that LED's 20 transmit over only a relatively small portion of this wavelength (curve 34) while detectors, for example, photodiodes 28, detect radiation over a wider portion of this wavelength (curve 35). The center wavelengths for the LED's and the photodetectors are somewhat displaced, but there is a relatively narrow band (curve 36) where both the LED's and the photodiodes operate at a relatively high level. In order to prevent saturation of a photodiode 28, optical filter 29 has a passband of about 55 nm centered at about 880 nm which is roughly the center of the peak overlap region for the LED and photodiode. The filter need not exclude radiation below 200 nm or above 1200 nm since this radiation is not accepted by the detector. Suitable filters for performing this optical band-pass function are optical thin film coated filters which are coated by optical deposition on glass. Such filters are, for example, utilized on astronauts' space helmets. By this narrow band filtering technique, only infrared light from a source 14 reflected from space 18 is received at photodiode 28, and saturation of the photodiode is therefore avoided.

FIGS. 4A and 4B combine to form a schematic diagram for an illustrative embodiment of the invention.

The embodiment is illustrative in that it includes, for purposes of illustration, certain features which might typically be provided alternatively in an actual system rather than being included together. Referring to FIG. 4, it is seen that each source 14A, 14B is driven by a corresponding infrared driver 40A, 40B. Drivers 40, when enabled, apply suitable signals to the infrared LED's of the corresponding source 14 to turn the LED's on. Drivers 40 are controlled by a driver control 42 which, as will be discussed later, may operate the drivers either simultaneously, sequentially, or in some other mode in response to a mode control input on line 44. The mode control input may be inputted manually by a system user or may be provided by a system control processor (not shown). Triggering or pulsing for drivers 40 is applied through driver control 42 from a 2 KHz clock 46.

The outputs from detectors 16A and 16B are applied through current-to-voltage amplifiers 48A, 48B, respectively, to corresponding sample and hold circuits 50A, 50B. The time at which a sample is taken by each S/H circuit 50 is controlled by an output from delay and shape control circuit 51. The input to circuit 51 is the output from OR gate 53, the inputs to OR gate 53 being the triggering inputs to drivers 40A and 40B. Circuit 51 slightly delays the triggering pulse applied thereto and also narrows the triggering pulse. Thus, each sample and hold circuit 50 takes a sample a short time after a source 14 is triggered, the delay compensating for delays in the firing of the LED's after triggering and the response time of the detector circuitry.

The outputs from both I/V amplifiers 48 are applied as inputs to AC amplifier 54. This amplifier functions as a 2 KHz pass filter, generating an output on line 56 having a voltage in the 1 to 5 volt range when signals are being received from amplifiers 48 in this frequency range, and generating an output on line 56 of less than 1 volt when no output at the 2 KHz frequency is being generated. It will be remembered that the clock rate at which sources 14 are being driven is approximately 2 KHz, meaning that there will be an output at this frequency from the detectors if the system is functioning normally. If outputs at this frequency are not being received from detectors 16, it either means that the detectors have been saturated by ambient light, that one of the detectors is malfunctioning for other reasons, that the sources are not generating outputs for some reason or that there is some other problem in the system. The lack of an output at 2 KHz is detected by "<1V" detector 58, causing an output on line 60 which is applied through OR gate 62 to set "Occupied" circuit 64. An "occupied" output appears on line 65 when circuit 64 is set. Thus, if there is a malfunction in the system, a fail-safe is provided to assure that action taken when a person is detected in space 18 is also taken with the malfunction.

The outputs from sample and holds 50A and 50B on lines 66A and 66B, respectively, are applied as the two inputs to AC amplifier 68, as the two inputs to ">5 volt" detector 70, as one set of inputs to compare circuits 72A and 72B, respectively, as the information inputs to gates 74A and 74B, respectively, as the inputs to rate of change detector circuit 76 and as the inputs to peak detect circuits 78A and 78B, respectively. AC amplifier 68 functions as a band-pass filter to generate an output if the received input is between 0.03 Hz and 3 Hz. Circuit 68 is part of a motion detection circuit, with the lower portion of the band being selected to filter out DC signals while the upper part of the band filters out spurious variations such as the 60 Hz variation from electrical lines and other ambient relatively high frequency variations. The sample and hold circuits 50 should filter out most such high frequency variations, and can be designed to do so, in which case amplifier 68 can merely function as a high-pass filter. If sample and holds 50 do not filter out high frequency variations, then such filtering should probably be performed by a filter circuit between each sample and hold and the remaining circuitry. The output from amplifier 68 is applied to a ">20 MV" detector 80, with an output on line 82 from detector 80 being indicative of motion in area 18. The signal on line 82 is applied to reset sustain circuit 84. Circuit 84 generates an output on line 86 for a selected time period, for example five minutes, after motion is detected in space 18. Each time there is a motion output on line 82, circuit 84 is reset so that it will continue to generate an output on line 86 for the sustain period of circuit 84 after the last motion is detected in space 18. A control input 87 may be provided to circuit 84 to permit the sustain period to be varied. Thus, while the normal sustain period may be five minutes, a shorter sustain period, for example 30 seconds, may be selected by use of control 87, for example, during initialization of the circuit. Sustain circuit 84 may, for example, contain a capacitor which is charged by an input on line 82 and then discharges at a rate such that the capacitor output does not fall below a threshold level causing an output on line 86 for the sustain duration. The resistance of the capacitor discharge path may, for example, be controlled to vary the sustain period.

Sustain circuit 84 performs two functions. First, it provides a substantially continuous motion output on line 86 once motion is detected for use in the circuit even though the actual motion detected may be of relatively short duration. Second, as will be discussed later, it provides an indication that motion has not been detected for the sustain period which may be utilized in a manner to be described later to indicate that a change in background level has occurred.

Circuit 70 generates an output on line 88 if the output from either sample and hold 50 exceeds a selected maximum value for such circuit. For example, if the maximum permitted output from a sample and hold circuit is 5 volts, then detector 70 will generate an output on line 88 if the output from either of the circuits 50 is equal to or greater than 5 volts. Alternatively, such output could be generated if the output from either sample and hold is greater than 4.99 volts. A signal on line 88 is applied as an additional input to OR gate 62 to set "occupied" circuit 64. This is another fail-safe feature which causes an occupied output to be generated in the event reflections from an individual or object in space 18 is such that either one or both of detectors 16 saturate. In this case, the system reacts as if there were a person in area 18 so as to assure that an individual entering the space who may be masked as a result of detector saturation does not go undetected and is not harmed.

A register or other memory 90A, 90B is provided for storing a background level for each detector 16. The output from store 90A is connected as the second input to compare circuit 72A and the output from store 90B is connected as a second input to compare circuit 72B. Compare circuits 72A and 72B generate outputs on lines 92A and 92B, respectively, if the inputs to the compare circuit are not within 100 millivolts, 100 millivolts being the detection threshold. The output appears on line 92 regardless of whether the input is greater or less than the input. Comparators 72 thus indicate increased reflection and increased absorption, thus solving the "stealthperson" problem. The outputs on lines 92A and 92B are applied as the inputs to OR gate 98, the output from which on lime 100 is a presence indication. The presence indication in line 100 is applied through a sustain circuit 102 which functions in the same manner as sustain circuit 84 to continue a presence indication on output line 104 for some period of time after a presence indication is no longer indicated at the output from either compare circuit 72. The sustain period of circuit 102 would typically be relatively short, for example, five seconds, and serves to prevent rapid fluctuations in the presence indication when, for example, an individual is standing at the edge of space 18 and is moving about.

The presence indication on line 104 is applied as one input to AND gate 110 and as one input to AND gate 112. Output line 118 from AND gate 110 is connected as the final input to OR gate 62 with the output from OR gate 62 being inverted in inverter 120 and applied to the reset input of the occupied circuit. Motion line 86 from sustain circuit 84 is connected as the second input to AND gate 110 and as the input to trailing edge detector 122, the output from detector 122 being connected as the final input to AND gate 112. Detector generates an output on the transition when the signal on line 86 terminates and may not be required if AND gate 112 is of a type which responds only to such transitions.

Output line 130 from AND gate 112 is connected to enable gates 74A and 74B to pass the values in sample and holds 50A and 50B, respectively, to corresponding background level stores 90A and 90B.

Rate of change detector 76 detects the rate of change of the outputs from sample and holds 50A and 50B and applies information concerning such rates of change through lines 140 to motion compute circuit 142. Peaks detected by peak detector circuits 78A and 78B are applied to $\Delta T$ detection circuit 144 which determines the time between the occurrence of such peaks. This information is applied through line 146 to motion compute circuit 142.

In operation, assume that mode control 44 is initially set so that drives 40A and 40B trigger simultaneously in response to an output from clock 46. The operation under these conditions are generally illustrated by the flow diagram of FIGS. 5A and 5B. When operation commences, step 150, three things occur in response to the infrared radiation outputted from sources 14. First, a determination is made during step 152 as to whether circuits 68 and 80 are detecting a low frequency variations in the outputs from either detector 16A or 16B. As previously indicated, such an output is indicative of motion in space 18 and results in a motion output on line 86 (step 154). During this step, sustain circuit 84 is also reset by the detected motion so that it will continue to generate an output for five minutes after such motion is detected.

At the same time that the circuit is looking for motion, the circuit is also determining if either of the compare circuits 72 is generating an output indicating that the detected reflections differ from the background reflection level (step 56). Since at turn-on, the background reflection levels stored in stores 90 may be 0 or may be old reflection levels which are no longer valid, the system normally generates a "yes" output during the initial operation of step 156. Therefore, at start-up, there will typically be a mismatch condition for at least one and normally both of detectors 72, resulting in a presence output on line 104 ((step 158). Assuming a person is also in the space, or as a result of normal start-up transients, there is also a motion ouput on line 86 resulting in the system being switched to its occupied state. Assuming the level stored at least one of the stores 90 is different from the current background level at turn-on, the presence indication on line 104 will continue indefinitely and, for a system which relies only on presence detection would cause the system to permanently remain in an occupied state. For the fume hood application previously discussed, this would cause the hood to operate in an expensive, high velocity mode even though operation in such mode might not necessarily be required if the individual were to leave the area. With the current system, once an individual leaves the space 18 or after starts-up transients have settled, sustain circuit 84 would normally continue to generate a motion output for five minutes before terminating. As previously indicated, when the signal on line 86 terminates, AND gate 110 is no longer fully enabled causing inverter 120 to reset the occupied circuit. The signal on line 86 terminating also causes detector 122 to fully enable AND gate 112, permitting gates 74 to be enabled to store the current detected levels, which are the new background levels, in background level stores 90. The background level stores are thus automatically updated within five minutes of turn-on or of an individual leaving space 18, whichever is later, and the system is then ready for normal operation. If it is desired to shorten this turn-on period, a control input may be applied through line 87 to sustain circuit 84, for example, by manually turning a dial on the unit to decrease a discharge circuit resistance, so as to reduce the sustain time of circuit 84 to, for example 30 seconds. The operator would then leave the area, permitting circuit 84 to time out and the appropriate background levels to be stored in stores 90 in a shorter time period.

The other thing that can happen after a start input is that a fail-safe condition is detected (step 164). The operations of the two fail-safe circuits 54 and 70 have been previously described. When either of these fail-safe conditions is detected, a signal is applied through OR gate 62 to set occupied circuit 64, causing an output on line 65 (step 162). When neither of the fail-safe conditions is present, and there is either no output on presence line 104 from sustain circuit 102 or on motion line 86 from sustain circuit 84 (step 165), then inverter 120 resets occupied circuit 64. If there is a no output during step 165, the system remains in the occupied state.

Any time there is a presence indication on line 104, but sustain circuit 84 has timed out so that there is no output on motion line 86, this means that the presence indication is a false indication resulting from an object being moved into space 18 or some other change in background level. When this is detected during step 168, the operation proceeds to step 170 to cause the background levels stored in store 90 to be updated in the manner previously described.

When motion is detected during step 154, it may also be desired to determine the direction and rate for such motion. The operation may thus proceed to step 172 to determine the rate of change for the detectors in circuit 76. If these rates are increasing, this normally means that a person is moving toward the protected element, for example fume hood 10, the slope of the increase being indicative of the rate of approach. Similarly, if the output from a sample and hold 50 is decreasing, it normally means that a person is moving away from the protected element at a rate which is indicated by the slope of the decrease. Circuit 76 detects the direction and slope of the outputs from each of the sample and holds 50 and passes this information on to motion compute circuit 142 which performs necessary computations to determine the direction and speed at which a person, is moving in area 18.

While circuit 76 provides information which is useful in detecting a person moving toward or away from fume hood 10, it does not provide information concerning a person moving In area 18 in a direction generally parallel to the fume hood. This information can be determined during step 174 by use of peak detector circuits 78 and AT detector 144. In particular, since detectors 16 are spaced from each other, as a person moves parallel to the fume hood they will initially be closer to one detector and will, as they move away from that detector, come closer to the other detector. Thus the first detector will generate a peak output at a point when the person is closest to that detector and a second detector will generate a peak output at a later point in time when the individual is closer to the second detector. The sequence in which these peaks are detected indicates the direction in which the person is moving and the time between the detection of such peaks, as determined by circuit 144, is indicative of the rate at which the individual is moving. This information is provided to motion compute circuit 142 which may use this information either alone or in conjunction with the information from detector 76, to obtain a fuller picture of the direction and rate of movement for the individual (step 176).

Once there is a presence detected resulting in a presence output on line 104 (step 158), such presence continues for the sustain period of circuit 102 (for example five seconds), after presence is no longer detected in space 18. Step 180 determines if such presence output is no longer present, the five second interval having expired. If a no output is determined during this step, the step is continuously repeated so long as there is a presence output. When a "yes" output is obtained during step 180, the operation proceeds to step 180 to terminate the presence output. Assuming there is no fail-safe condition in existence at this time, the termination of the presence output also results in the resetting of occupied circuit 64 (steps 165 and 166).

If a no output is obtained during steps 152, 156, 160, 164 or 168 or at the completion of steps 166, 170, 176 or 182, the operation returns to point A to again look for presence, motion or a fail-safe condition.

While two techniques for speed and direction detection are discussed above, other techniques are also possible. For example, a mask could be put in front of the sources 14 and/or detectors 16. This breaks the image of the detection area into slots. When a person walks by, the received light is modulated with a square wave. The higher the frequency of the square wave, the faster the object is moving.

Another possible way of detecting speed is to provide a plurality of sources 14 and to utilize driver control 42 to cause Such sources to be sequentially energized. Detectors 16 will receive a string of pulses of different amplitude. Each pulse is the received light from a different angle, the angles corresponding to the slot pattern of the detection area. The signal for each angle is stored separately with a change in signal being detected by comparing each present signal with the stored signals from the last scan. When a person walks into the detection area, the amplitudes of the signals will change in order at a certain rate relative to the speed at which the person is moving. As the person moves faster, the signals will change faster. Other techniques for speed or direction detection may also be utilized.

For the preferred embodiment discussed above, a null or match condition with the background is avoids using two detectors 16 to look at the person or other entity at two different angles. It is assumed that a null condition will not simultaneously exist at the different angles, and the chances of this occurring are very low. However, since the detectors are more expensive than the sources, it may be desirable to use only a single detector with multiple sources. In order to achieve the advantages of this invention, with a null or match condition with the background being avoided by looking at the individual at two different angles, the sources 14 may be structured so that each source illuminates only a selected zone of space 18. In that case, drive control 42 would receive a mode control input on line 44 causing the drive control to sequentially operate sources 14 each time a clock signal is received. Where there are more than two sources 14, such sources may be operated or triggered sequentially or combinations of the sources may be operated in some sequence to successively illuminate the selected zones. A similar objective may be achieved by controlled sequential triggering of the individual LED's 20. The single detector 16 would then receive a first input with illumination of the individual at a certain angle and a second,input with the individual being illuminated from a different angle. Background store 90 will need to store a different background level for each detector for each selected zone it is to scan with the appropriate background level being inputted to the detector comparator 72 for the current zone being scanned. Analog or digital, preferably microprocessor, control could be used to properly effect this multiplexing operation. Detecting with different angle illumination in the manner just indicated will significantly reduce the possibility of an individual blending into the background.

While in the discussion above it has been generally assumed that sources 14 are infrared LED sources, as previously discussed, other radiation sources known in the art, including microwave sources, ultrasonic sources and various light sources such as lasers, may also be utilized to perform the detection function. For some such sources of radiation, techniques other than that shown in FIG. 2 may be utilized to assure broad area coverage of space 18. For example, with microwaves a horn device may be used for this purpose, while with lasers or other radiation sources a wide angle reflector might be utilized for performing this function.

While discrete elements have been shown in FIG. 4 for performing the various functions indicated, it is apparent that most of these functions could be performed by a special purpose computer or by a microprocessor or other programmed general purpose computer. It is also apparent that the various voltages, times and other values, as well as the specific components shown for performing various functions, are for purposes of illustration and that other values and components might be used in specific applications. Thus, while the invention has been particularly shown and described above with reference to an illustrative embodiment, the foregoing and other changes in form and detail may be made therein by one skilled in the art without departing from the spirit and scope of the invention.

What is claimed is:

1. A system for detecting a movable entity within a selected three-dimensional space comprising:
    at least one source of selected light radiation, said at least one source being structured to irradiate substantially all of said three-dimensional space;
    at least one detector for said light radiation, said at least one detector being structured to receive radiation from said source which is reflected by an entity anywhere within said space;
    means for recognizing both a positive and a negative change in the level of said reflected light radiation received at each of said detectors; and
    means responsive to said means for recognizing for at least one of said detectors for providing an indication of an entity within said selected space.

2. A system as claimed in claim 1 wherein said means for recognizing includes means for determining if the output from each detector differs from a stored background level indication for the detector by an amount exceeding a predetermined threshold and means for detecting low frequency variations in each detector output; and wherein said means for providing includes means responsive to said means for determining and to said means for detecting, respectively, for indicating presence and movement of an entity in the selected space.

3. A system as claimed in claim 1 wherein each of said sources of light radiation contains a plurality of infrared emitters, each of said emitters being structured to irradiate a selected zone within said selected space.

4. A system as claimed in claim 3 wherein each of said emitters is pointed to generally irradiate the selected zone.

5. A system as claimed in claim 3 including a lens through which the output of each emitter is passed to cause said output to generally irradiate the selected zone for the emitter.

6. A system as claimed in claim 3 including a chamber for each of said sources, the chamber having four side walls, having the source positioned near the rear thereof, and having an open front through which radiation from the source passes, each chamber controlling the selected zones for the emitters of the corresponding source.

7. A system as claimed in claim 6 including a mask over at least selected ones of said open fronts, said masks further controlling the selected zones for the emitters of the corresponding source.

8. A system as claimed in claim 1 wherein there are a plurality of said sources of radiation, each of which is structured to irradiate a selected zone within said space.

9. A system as claimed in claim 8 including means for sequentially energizing said sources.

10. A system as claimed in claim 1 wherein there are a plurality of said detectors, said detectors being spaced from each other and each of said detectors being structured to receive radiation from a selected zone within said selected space.

11. A system as claimed in claim 1 wherein each said source and each said detector operate in a first frequency band and a second frequency band, respectively, said first and second frequency bands having a narrow overlap region, and including an optical band pass filter for each detector, which filter passes to the detector only reflected radiation which is substantially within said narrow over lap region.

12. A system as claimed in claim 1 including means for controlling a zone within said selected space from which each detector receives radiation during a given energizing of a source.

13. A system as claimed in claim 12 wherein there are a plurality of said detectors, and wherein the zone for each of said detectors is substantially all of said selected space.

14. A system as claimed in claim 12 wherein said means for controlling includes a wide-angle lens for each of said detectors.

15. A system as claimed in claim 12 wherein said means for controlling includes a chamber for each of the detectors having four side walls, the detector positioned near the rear thereof, and having an open front through which light radiation reaches the detector.

16. A system as claimed in claim 15 wherein said means for controlling includes a mask over at least selected ones of said open fronts.

17. A system as claimed in claim 1 wherein said movable entity is a person, wherein said space is a selected space in front of a fume hood, and wherein said indication is utilized to control a flow parameter of the hood.

18. A system as claimed in claim 1 including a fail-safe protection means, said means including means for detecting the saturation of a detector, and means for providing an indication of a person in the space in response to a saturation detection.

19. A system as claimed in claim 18 wherein said means for detecting includes means for detecting a DC output from a detector, which output exceeds a predetermined value.

20. A system as claimed in claim 18 including means for energizing said at least one source at a selected clock rate, and wherein said means for detecting includes means detecting the absence of a signal at said clock rate from the detector.

21. A system for detecting a movable entity within a selected three-dimensional space comprising:
    at least one source of selected light radiation;
    at least one detector for said light radiation, said at least one detector being structured to receive radiation from said source which is reflected by an entity within said space;
    each said source and each said detector operating in a first frequency band and a second frequency band respectively having a narrow overlap region, and including an optical band pass filter for each detector, which filter passes to the detector only reflected radiation which is substantially within said narrow overlap region;
    means for recognizing a change in the level of said reflected light radiation received at each of said detectors; and
    means responsive to said means for recognizing for at least one of said detectors for providing an indication of an entity within said selected space.

22. A system for detecting a movable entity within a selected three-dimensional space comprising:
    at least one source of selected radiation;
    at least one detector for said radiation, said at least one detector being structured to receive radiation from said source which is reflected by an entity within said space;
    means for detecting a low frequency variation in the output from at least one of said detectors; and means responsive to the detecting of said low frequency variation from a detector for indicating motion in said selected space.

23. A system as claimed in claim 22 including means for establishing a background level indication for each detector, means for determining of the output from each detector differs from the established background level indication for the detector by an amount exceeding a predetermined threshold, and means responsive to a detector output differing by said amount for indicating presence of an entity in the selected space.

24. A system as claimed in claim 23 wherein said difference may be either positive or negative.

25. A system as claimed in claim 23 including means for automatically changing said established background level indication for a detector in response to changes in the background for the detector.

26. A system as claimed in claim 25 wherein said means for changing changes the established background level for a detector to the current level for the detector in response to a presence indication coupled with no motion indication for a predetermined time interval.

27. A system as claimed in claim 23 wherein said means for providing includes means for maintaining a presence indication for a selected time interval after said means for determining no longer detects a detector output differing by said amount.

28. A system as claimed in claim 22 wherein there are a plurality of said sources, each of which irradiates a selected zone of said space, and including means for sequentially energizing said sources whereby said selected zones are successively irradiated, means for establishing a separate background level indication for each detector for each zone from which it receives reflections, means operative for each irradiation of a zone by a source for determining if the output from each detector differs from the established background level indication for the detector for the irradiated zone by an amount exceeding a predetermined threshold, and means responsive to a detector output differing by said amount for indicating presence of an entity in the selected space.

29. A system as claimed in claim 22 including means for detecting at least one of the speed and direction at which a personals moving through said selected space and for providing an indication thereof.

30. A system as claimed in claim 29 wherein the output from a detector has a slope which varies as a function of the speed and direction of detected entity motion, and wherein said means for detecting speed includes means for detecting the slope of the output from the at least one detector.

31. A system as claimed in claim 29 wherein there are a plurality of said detectors, wherein said means for detecting speed includes means for detecting peaks at each detector, means for determining the time between peaks at successive detectors, and means for utilizing the determined time to determine speed.

32. A system for detecting a movable entity within a selected three-dimensional space comprising:
at least one source of radiation at a selected frequency band, said at least one source being structured to irradiate at least a selected portion of said space;
at least one detector for radiation within said selected frequency band, said at least one detector being structured to receive radiation reflected by an entity within said space;
means for establishing for each detector an indication of background level radiation received by said detector;
means for automatically changing the established background level indication for a detector in response to changes in the background for the detector;
means for establishing for each detector an indication of background level radiation received by said detector;
means for recognizing a change in the received radiation from the established background level radiation at each of said detectors; and
means responsive to said means for recognizing for at least one of said detectors for providing an indication of the presence of an entity within said selected space.

33. A system as claimed in claim 32 wherein said means for recognizing includes means for comparing the output from each detector with an established background level indication for the detector, and wherein said means for providing includes means responsive to said means for comparing detecting a difference exceeding a predetermined threshold for indicating the presence of an entity in the selected space.

34. A system as claimed in claim 32 wherein there are a plurality of said detectors, said detectors being spaced from each other and each of said detectors being structured to receive radiation from said selected space.

35. A system as claimed in claim 32 wherein there are a plurality of said sources of radiation, each of which is structured to irradiate a selected zone within said space, wherein there is an established background level for each detector for each zone from what it receives reflections and including means for sequentially energizing said sources whereby said selected zones are successively irradiated, means operative for each irradiation of a zone by a source for determining if the output from each detector differs from the established background level indication for the detector for the irradiated zone by an amount exceeding a predetermined threshold, and means responsive to a detector output differing by said amount for indicating presence of an entity in the selected space.

36. A system as claimed in claim 32 wherein said means for recognizing includes means for recognizing a rate of change in the output from at least one of said detectors within a predetermined range, wherein said means for providing provides an indication of motion in the selected space in response to the recognition of a rate of change for a detector within said predetermined range, and wherein said means for changing changes the established background level for the detector to the current level for the detector in response to a presence indication coupled with no motion indication for a predetermined time interval.

37. A system for detecting a movable entity within a selected three-dimensional space comprising:
at least one source of radiation at a selected frequency band, said at least one source being structured to irradiate at least a selected portion of said space;
at least one detector for radiation within said selected frequency band, said at least one detector being structured to receive radiation reflected by an entity within said space;
means for establishing for each detector an indication of background level radiation received by said detector;
means for recognizing both an increase and a decrease in the received radiation from the established background level radiation at each of said detectors; and
means responsive to said means for recognizing for at least one of said detectors for providing an indication of an entity within said selected space.

* * * * *